United States Patent
Nordskog

[15] 3,690,415
[45] Sept. 12, 1972

[54] WHEEL LOCK ASSEMBLY
[72] Inventor: Robert A. Nordskog, Tarzana, Calif.
[73] Assignee: Nordskog Company, Inc., Van Nuys, Calif.
[22] Filed: Nov. 4, 1970
[21] Appl. No.: 86,786

[52] U.S. Cl. .....................188/69, 188/31, 188/167
[51] Int. Cl. ...........................................B60t 1/02
[58] Field of Search........188/19, 20, 31, 60, 69, 167, 188/119

[56] References Cited
UNITED STATES PATENTS 2,679,302   5/1954   Watson et al................188/31
2,988,175   6/1961   West............................188/31
3,200,907   8/1965   Hansen....................188/31 X Primary Examiner—Duane A. Reger
Attorney—Robert E. Geauque

[57] ABSTRACT

A wheel lock assembly for a serving cart to be normally employed within an aircraft in which a pin is under constant bias toward cooperation with an aperture of a group of apertures located in the hub of the wheel, the pin being movable against the bias by means of a manually operated actuator.

10 Claims, 5 Drawing Figures

PATENTED SEP 12 1972        3,690,415
FIG. 1.
FIG. 2.
FIG. 3.
FIG. 4.
FIG. 5.
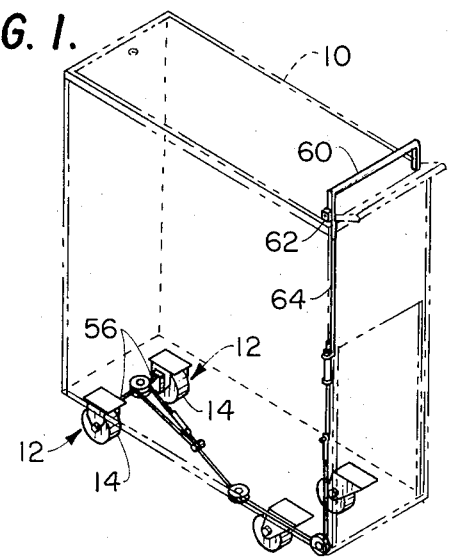
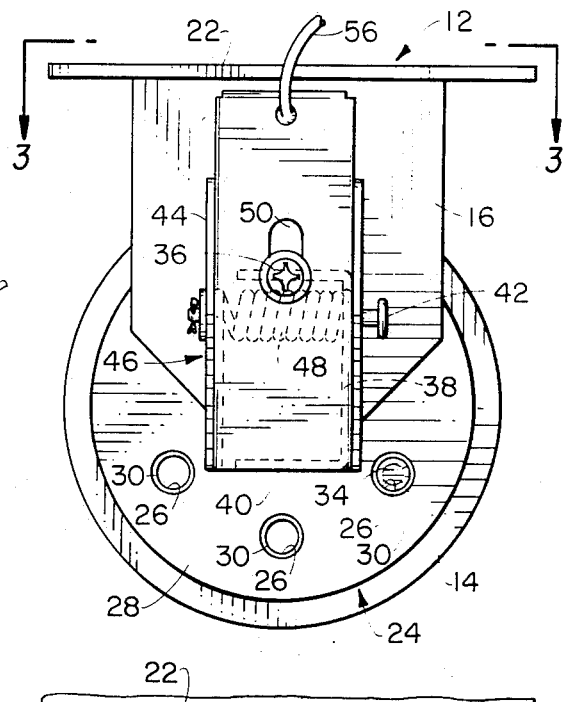
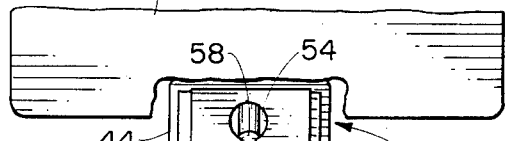
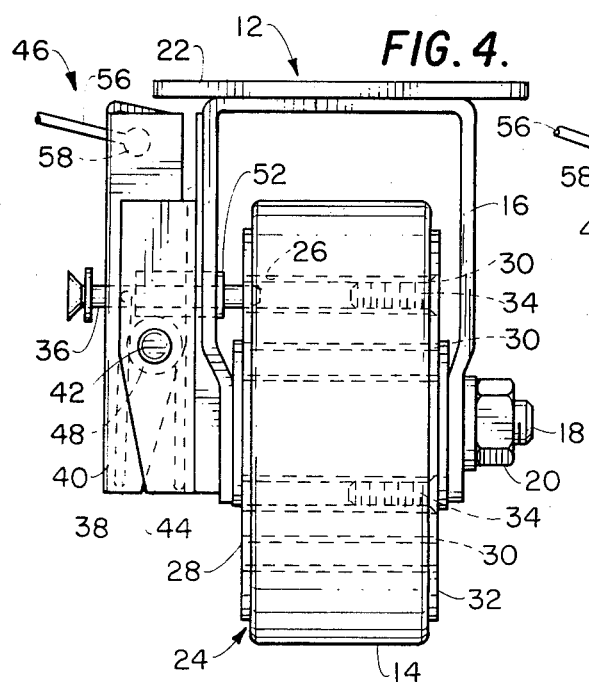
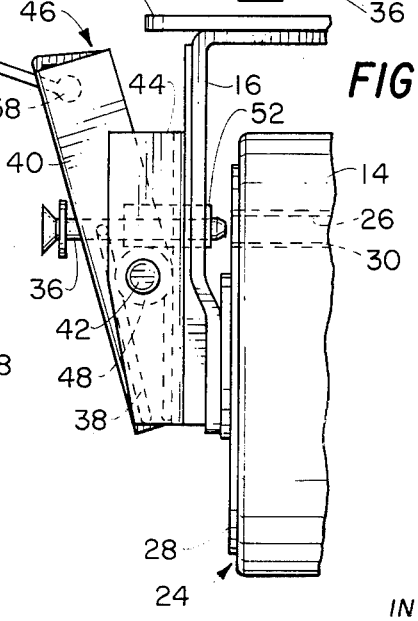
INVENTOR.
ROBERT A. NORDSKOG
BY
*R. E. Geangue*
ATTORNEY

WHEEL LOCK ASSEMBLY

BACKGROUND OF THE INVENTION

Within aircraft it is most common for the stewardesses to employ the use of a serving cart to serve the passengers. The cart is to contain a supply of foodstuffs or beverages. The stewardess then progressively distributes the consumable products to the passengers. The normal procedure for the stewardess is to move the cart down the aisle of the aircraft adjacent the row of seats where it is desired to distribute the goods, stop the cart and maintain it in the stopped position until after the distribution of goods.

The aircraft may not be flying level as it may be in a climbing or descending mode. Also, the aircraft may be incurring undesirable turbulence causing the aircraft to move about. Some form of a brake means will have to be employed upon the cart to hold the cart in position when it is stopped. Otherwise, the cart may proceed down the aisle of the aircraft unattended.

Heretofore, the common form of device to hold the cart in position has taken the form of a common brake. The brake usually employs the use of a shoe which is to be biasingly applied into contact with a wheel or wheels of the cart, the frictional engagement of such being sufficient to retain the cart stationary. However, in the past such devices have proved to permit a certain amount of slippage. Further, such brakes are usually foot actuated and frequently results in the scuffing of the shoes of the operator. Additionally, if the aircraft incurs a sufficient loss or rise in altitude, the resulting G-force may cause release of the brake permitting cart movement. Further, such brakes are put into effect upon movement of a lever or a push button or the like. This additional movement, required by the stewardess, is time consuming and it would be desirable to avoid such a movement. Further, such brake devices inherently wear out and after a period of time must require replacement. This maintenance factor further makes the use of such frictional brakes undesirable.

It would be desirable to design a brake which was positively locking and did not depend upon frictional engagement for retention. Also, it would be desirable for the wheel brake to be automatically engaged upon the stewardess removing her hands from the cart. Further, it would be desirable to design a wheel lock so that it would be actuatable by the stewardesses hands and not by the feet of the stewardess.

SUMMARY OF THE INVENTION

The wheel lock assembly of this invention is designed to be employed in combination with one or more wheels of a serving cart. Within the hub portion of the wheel are to be located a plurality of longitudinal apertures concentrically displaced from the wheel axis. A pin is adapted to be movable into cooperation with a single aperture. The pin is to be movable into or out of cooperation with an aperture. The pin is supported within a housing assembly which is to be associated adjacent the wheel. The housing assembly is composed of first and second mating elements with the elements being pivotable with respect to one another. A spring bias is included within the housing and functions to bias the elements in a given direction. This direction is such as to tend to move the pin into cooperation with an aperture. A cable system is connected from the handle of the cart to the movable element of the housing. Upon movement of the cable, which is to occur upon the stewardess grasping the cart handle, the cable causes pivotal movement of the movable element of the housing with respect to the fixed element, resulting in movement of the pin out of association with an aperture. The cart is then free to move along the aisle of the aircraft.

BRIEF DESCRIPTION OF THE DRAWING

FIG. 1 is an overall isometric view of a serving cart which is to employ the wheel lock assembly of this invention;

FIG. 2 is a side view of a wheel assembly of the cart of FIG. 1 showing more clearly the wheel lock assembly of this invention;

FIG. 3 is a fragmentary top view of the wheel of FIG. 2 taken along line 3—3 of FIG. 2;

FIG. 4 is a side view of the wheel lock assembly of this invention taken along line 4—4 of FIG. 2; and FIG. 5 is a fragmentary side view similar to FIG. 4 but showing the wheel lock assembly of this invention in the position permitting rotation of the wheel.

DETAILED DESCRIPTION OF THE SHOWN EMBODIMENT

Referring particularly to the drawing, there is shown in FIG. 1 a serving cart 10 of the type which would commonly be employed in an aircraft to facilitate the serving of foodstuffs and beverages to the passengers of the aircraft. It is to be understood that while the wheel lock assembly is most adaptable in such an environment, it may be readily employed in other similar environments. The cart 10 is mounted on a plurality (four in number being shown) of wheel assemblies 12. Each of the wheel assemblies 12 includes a wheel 14 which functions to facilitate low frictional movement of the cart 10 with respect to the aisle floor of the aircraft. Each of the wheels 14 is secured to a U-shaped attaching bracket 16 by means of a shaft 18. Shaft 18 is centrally located through the wheel 14 along its wheel axis. It is to be understood that the shaft 18 permits low frictional rotational movement of the wheel 14 with respect thereto. The shaft 18 is conventionally secured to bracket 16 as by means of nut 20. Connected to the apex portion of the bracket 16 is a mounting plate 22. Mounting plate 22 permits the securing of the wheel assembly 12 to the cart 10.

Concentrically disposed about the wheel axis and formed within the hub 24 of the wheel 14 are a plurality of spaced apart longitudinally located apertures 26. Actually, it is desirable that six (in number) of such apertures be employed. Integrally secured to a first wheel plate 28 are a plurality of upstanding sleeves 30. The first wheel plate 28 is to be locatable adjacent one side of the wheel 14 so that each of the sleeves 30 cooperate, in a snug fitting manner, with an aperture 26. A second wheel plate 32 is to be locatable on the opposite side of the wheel 14 and is to include openings therein which are alignable with apertures 26. Screw fasteners 34 are to cooperate with the openings in the second wheel plate 32 and be connectable with a sleeve 30. Fasteners 34 to be tightened sufficiently so as to form an integral unit comprising the wheel 14, the first wheel plate 28 and second wheel plate 32. It is to be noted that the length of the fastener 34 extends only approximately halfway through the thickness of the wheel 14. It is to be noted that only three in number of such fasteners 34 are to be employed. However, the number of fasteners 34 is strictly to be a matter of choice or design.

A pin 36 is to be cooperatable with any one of the apertures 26. It is only necessary for pin 36 to extend a small distance within an aperture 26, and in actual practice only a slight amount past the inner surface of the first wheel plate 28. The pin 36 is connected by a U-shaped key 38 to a movable element 40. One leg of the U-shaped 38 passes through an opening within the pin 36, thereby causing the pin 36 to be movable with the movable element 40. It is to be noted that a small amount of pivotal movement is permitted of the pin 36 with respect to the movable element 40.

Movable element 40 is pivotally mounted by means of a cotter key 42 with respect to a fixed element 44. The movable element 40 and the fixed element 44 cooperate in a mating manner resulting in the formation of a housing 46. Located about cotter key 42 is a compression spring 48. The spring 48 exerts a constant bias upon the movable element 40 to locate such with respect to the fixed element 44 in the position as shown in FIG. 4 of the drawing. Pin 36 passes through a slot 50 within the movable element 40 and also through a guide sleeve 52 formed within the fixed element 44. The guide sleeve 52 also cooperates with an opening located within the attaching bracket 16. It is to be noted that the guide sleeve 52 cooperates with the pin 36 to give a loose fit with respect thereto. It is also to be noted that a location of the pin 36 is adjacent to cotter key 42 but on the side thereof opposite the biasing chamber of the spring 48. With the housing 46 in the position as shown in FIG. 4 of the drawing, the pin 36 is capable of cooperating with an aperture 26 within the wheel 14.

A keyway slot 54 is formed in the upper end of the movable element 40. A cable 56 terminates in a bulbous end 58. The bulbous end 58 is to pass through the keyway slot 54 so that upon movement of the cable 56 to effect movement of the movable element 40 against the spring bias, the bulbous end 58 will come into contact with the inner surface of the movable element 40 and not permit the disassociation of the cable 56 from the element 40.

The operation of the wheel lock assembly of this invention is as follows: It will be presumed that the stewardess of the aircraft is in the process of moving the loaded serving cart 10 down the aisle of the aircraft. The stewardess would naturally be grasping the handle 60 of the cart 10 to effect the movement of such. Handle 60 is bifurcated and pivotable between a substantially vertical position and a horizontal position. The legs of the handle 60 are fulcrumed spaced from their ends thereof. The end 62 of a leg of the handle 60 is attached to a main cable element 64. The cable element 64 is transmitted through a pulley system to branch cables 56. The branch cables 56 are connected to each wheel assembly 12. Upon the stewardess grasping the handle 60 and moving such to the horizontal position, the end 62 effects a stretching of main cable element 64 (likewise of branch cables 56). As a result, the movable element 40 of each of the wheel assemblies 12 is caused to be pivoted against the action of the bias of spring 48 to the position shown in FIG. 5 of the drawing. The pin 36 of each of the wheel assemblies 12 has been removed from cooperation with an aperture 26, permitting unhindered rotation of wheel 14.

Upon the stewardess reaching the desired row of passenger seats to distribute the foodstuffs and/or beverages, the stewardess then releases her grasp upon the handle 60. As a result, the handle 60 moves to the vertical position causing slack in the main cable element 64 and the branch cables 56. Movement of movable element 40, under action of the spring 48, toward the position shown in FIG. 4 of the drawing is caused. What actually results is either the pin 36 automatically comes into cooperation with one of the apertures 26 or contacts the hub 28 in the area between the apertures. Because of the loose fit of the pin 36 within the guide sleeve 52, any slight misalignment of the pin 36 with respect to an aperture 26 is compensated for. If the pin 36 is immediately moved into contact with an aperture 26, a locking of the wheel 14 occurs resulting in a retaining of the serving car 10 against movement. If the pin 36 contacts the hub 28, a small amount of continued rotation of the wheel 14 results in the pin 36 cooperating within an aperture 26. It is to be noted because there are six (in number) of such apertures 26 within each wheel 14, the maximum angular amount of rotation of the pin 36 in contact with the hub portion 28 would be 60°. This is a relatively small amount of angular displacement requiring only about an inch of additional cart movement for the pin 36 to come into contact with an aperture 26.

Upon the stewardess desiring to again move the cart, it is only necessary for the stewardess to grasp the handle 60 of the cart and effect a compression of the lever 62. Therefore, the movable element 40 of each wheel assembly 12 is pivoted against the action of the respective spring 48, thereby causing disassociation of the pin 36 from an aperture 26. Therefore, rotation of the wheels 14 are permitted.

What is claimed is:

1. In combination with an object, said object having at least a wheel to facilitate moving of said object, a wheel lock assembly comprising:
   an aperture structure formed within the hub portion of said wheel, the longitudinal axis of said aperture structure being substantially parallel to the axis of said wheel;
   a housing located adjacent said wheel, said housing being formed of a movable element and a fixed element, said movable element being pivotally attached to said fixed element;
   A biasing means located between said movable element and said fixed element;
   a pin connected to said movable element, said pin being capable of cooperating with said aperture structure to thereby prevent rotation of said wheel, said biasing means tending to move said pin into cooperation with said aperture structure, said pin being movable out of disassociation of said aperture structure, the direction of said pin movement being substantially parallel to the wheel axis; and
   manually operated actuating means to facilitate movement of said movable element with respect to said fixed element.

2. 2 The combination as defined in claim 1 wherein:

said pin being capable of a slight amount of pivotal movement with respect to said movable element.

3. In combination with an object, said object having at least a wheel to facilitate moving of said object, a wheel lock assembly comprising:

an aperture structure formed within the hub portion of said wheel;

a housing located adjacent said wheel, said housing being formed of a movable element and a fixed element, said movable element being pivotally attached to said fixed element;

a biasing means located between said movable element and said fixed element;

a pin connected to said movable element, said pin being capable of cooperating with said aperture structure to thereby prevent rotation of said wheel, said biasing means tending to move said pin into cooperation with said aperture structure, said pin being movable out of disassociation of said aperture structure;

manually operated actuating means to facilitate movement of said movable element with respect to said fixed element;

said pin being capable of a slight amount of pivotal movement with respect to said movable element; and said pin being conducted through said fixed element, said pin having a loose fit with respect to said fixed element.

4. The combination as defined in claim 3 wherein:
the pivot axis of the attachment of said movable element to said fixed element being 90° displaced from the axis of said wheel.

5. The combination as defined in claim 4 wherein:
said aperture structure being located substantially parallel to the axis of said wheel.

6. The combination as defined in claim 5 wherein:
said aperture structure comprises a plurality of spaced apart apertures.

7. The combination as defined in claim 6 wherein:
said biasing means comprises a compression spring.

8. The combination as defined in claim 7 wherein:
said apertures are concentrically located about the wheel axis.

9. The combination as defined in claim 8 wherein:
said apertures are six in number.

10. The combination as defined in claim 9 wherein:
said actuating means includes a cable.

* * * * *